US012801912B2

(12) United States Patent
Oppl

(10) Patent No.: US 12,801,912 B2
(45) Date of Patent: Nov. 17, 2026

(54) COMPUTER SYSTEM AND METHOD FOR INCREASING PERFORMANCE OF A NEURAL NETWORK

(71) Applicant: Xephor Solutions GmbH, Purkersdorf (AT)

(72) Inventor: Konstantin Oppl, Purkersdorf (AT)

(73) Assignee: XEPHOR SOLUTIONS GMBH, Purkersdorf (AT)

( * ) Notice: Subject to any disclaimer, the term of this patent is extended or adjusted under 35 U.S.C. 154(b) by 1455 days.

(21) Appl. No.: 17/319,708

(22) Filed: May 13, 2021

(65) Prior Publication Data

US 2021/0357754 A1 Nov. 18, 2021

(30) Foreign Application Priority Data

May 14, 2020 (AT) .............................. A 50427/2020

(51) Int. Cl.
*G06N 3/08* (2023.01)
*G06F 18/21* (2023.01)
*G06N 3/045* (2023.01)

(52) U.S. Cl.
CPC ............ *G06N 3/08* (2013.01); *G06F 18/217* (2023.01); *G06N 3/045* (2023.01)

(58) Field of Classification Search
None
See application file for complete search history.

(56) References Cited

U.S. PATENT DOCUMENTS

| | | | |
|---|---|---|---|
| 4,972,363 A | 11/1990 | Nguyen et al. | |
| 9,558,443 B2 | 1/2017 | Alvarez-Icaza et al. | |
| 9,984,324 B2 | 5/2018 | Alvarez-Icaza et al. | |
| 10,929,747 B2 | 2/2021 | Alvarez-Icaza et al. | |
| 11,556,794 B2 | 1/2023 | Qian et al. | |
| 2015/0039546 A1 | 2/2015 | Alvarez-Icaza et al. | |
| 2017/0068885 A1 | 3/2017 | Alvarez-Icaza et al. | |
| 2018/0232634 A1 | 8/2018 | Alvarez-Icaza et al. | |
| 2018/0314935 A1 | 11/2018 | Lewis et al. | |
| 2018/0357753 A1* | 12/2018 | Lehtinen ................ | G06N 3/045 |
| 2019/0065956 A1 | 2/2019 | Qian et al. | |
| 2019/0096038 A1* | 3/2019 | El-Khamy ................ | G06T 5/60 |
| 2019/0156183 A1 | 5/2019 | Durham et al. | |

(Continued)

OTHER PUBLICATIONS

Ng, A. et al., "CS294A Lecture Notes," downloaded from <web.stanford.edu/class/cs294a/sparseAutoencoder_2011new.pdf> (2011) 19 pp. (Year: 2011).*

(Continued)

*Primary Examiner* — Brian M Smith
(74) *Attorney, Agent, or Firm* — Wenderoth, Lind & Ponack, L.L.P.

(57) ABSTRACT

A computer system implementing at least one neural network (1), a method for operating a computer system and a computer program for configuring such a computer system or for carrying out such a method in which at least a subset of synapses (3) of artificial neurons (2) of the at least one neural network (1) is defined as entangled synapses (3) the weight factors (w) of which are updated at the same time during a computational step on the basis of correlated random components and in which weight factors (w) of unentangled synapses (3) are updated individually on basis of uncorrelated random components.

19 Claims, 4 Drawing Sheets

(56) References Cited

U.S. PATENT DOCUMENTS

| | | | | |
|---|---|---|---|---|
| 2019/0244098 | A1 | 8/2019 | Tsukamoto et al. | |
| 2020/0218959 | A1 * | 7/2020 | Srinivasa | G06N 3/08 |

OTHER PUBLICATIONS

Dean, J. et al., "Large scale distributed deep networks," Advances in Neural Inform. Proc. Systems (2012) 11 pp. (Year: 2012).*

Gerasimos G. Rigatos, "Stochastic Processes and Neuronal Modelling: Quantum Harmonic Oscillator Dynamics in Neural Structures", Neural Process Lett (2010) 32, pp. 167-199.

Xuanqing Liu et al., "Neural SDE: Stabilizing Neural ODE Networks with Stochastic Noise", Jun. 7, 2019, url: https://arxiv.org/abs/1906.02355.

* cited by examiner

COMPUTER SYSTEM AND METHOD FOR INCREASING PERFORMANCE OF A NEURAL NETWORK

TECHNICAL FIELD

The present invention relates to the field of computer systems utilising artificial neural networks, more generally to a computer system having the features of the preamble of claim 1, a computer-implemented method having the features of the preamble of claim 8 and a computer program having the features of claim 14.

BACKGROUND

Artificial neural networks are structures which have a plurality of networked artificial neurons. In general, artificial neural networks are implemented on computer systems wherein the structure of the artificial neurons and the connections between the artificial neurons are simulated computationally. Artificial neural networks are most often based on networking many McCulloch-Pitts-Neurons or slight deviations thereof. As a general principle other artificial neurons can be used such as, e.g., the High-Order-Neuron.

Usually each single neuron of a neural network generates a single output value from a plurality of input signals (which, in usual representation in accordance with a natural neuron, are applied to the synapses of the neuron). The output value, in turn, forms an input signal which is used as an input signal for numerous synapses of different neurons. The connection via which the output value of the neuron is forwarded to the synapses of other neurons is called axon.

The totality of networked neurons forms the neural network. If an input signal is applied to a defined group of synapses the output values of the individual neurons are computed successively stepwise in a computational step until a result value has been computed at a defined group of axons.

By training the neural network, parameters of the neurons, so-called weight factors, are updated on the basis of training data until the neural network by itself gives as output a correct result value for new and unknown input values provided as input. Usually, the weight factors are assigned to single inputs, i.e., synapses, of the neurons. During training a result value outputted by the neural network is usually compared to a "correct" result value and an error deviation is computed therefrom. By use of a minimisation function the weight factors are then updated in such a way that the error deviation becomes minimal.

Liu X et al., "Neural SDE: Stabilizing Neural ODE Networks with Stochastic Noise", arXiv: 1906.02355v1 teaches the use of stochastic noise to stabilise neural ODE networks.

The following points are main disadvantages of the prior art:

As a rule, training leads to high-dimensional, non-linear optimisation problems. In practice, the fundamental difficulty in solving these problems is often the uncertainty whether the global optimum or only a local optimum has been found. Although a multitude of relatively fast converging local optimisation methods has been developed in mathematics (by way of example Quasi-Newton-Methods: BFGS, DFP, and so on) they often do not find optimal solutions. Possibly, a time-consuming approximation to the global solution can be reached by multiple repetition of the optimisation with ever new starting values.

Training data must be collected or manually generated. This process can be very difficult as one must prevent the neural network from learning characteristics of the patterns which, although there is some correlation with the result in the training set, cannot be used for a decision in other situations. If, for example, the brightness of the training pictures shows specific patterns it might happen that the neural network does not pay attention to the desired characteristics but classifies the data solely based on brightness.

When applying a heuristic approach for specification of the neural network, artificial neural networks tend to simply learn the training data by heart due to overfitting. When this happens the neural networks can no longer generalise to new data. In order to avoid overfitting the network architecture must be chosen carefully in the prior art.

Coding of training data must be chosen adapted to the problem and, if possible, without redundancy. The way of presenting data to be learned to the neural network can have a great influence on learning speed and on whether the problem can be learned by a neural network at all.

Pre-setting of weight factors plays an important role in the prior art. Therefore the neural network can usually not be initialised in a purely stochastic way (i.e., by using random numbers) before training.

SUMMARY OF INVENTION

It is an object of this invention to at least alleviate or eliminate the above-mentioned problems in connection with implementation, training and use of artificial neural networks.

One object of the disclosure relates to a computer system according to claim 1 which is able to be trained using less training data and/or to reach stable operation and operate faster than is known in the art.

Another object of the invention relates to a computer-implemented method according to claim 8 which is able to be trained using less training data and/or to reach stable operation and operate faster than is known in the art.

Yet another object of the invention relates to a computer program according to claim 14 which when the program is executed by a computer system causes the computer system to be configured according to claim 1 or any claim dependent thereon or to carry out the method according to claim 8 or any claim dependent thereon.

Embodiments of the invention are defined in the dependent claims.

The present disclosure can be applied to all kinds of artificial neural networks which comprise a plurality of artificial neurons and which allow training by updating weight factors.

In a first aspect the invention suggests a computer system comprising:

- at least one implemented neural network configured to determine as output at least one result value from at least one input value provided as input, wherein there is defined a plurality of weight factors (preferably which are adjustable by training the at least one neural network) and wherein each weight factor is assigned to a synapse of an artificial neuron of the at least one neural network and wherein at least one subset of synapses of the at least one neural network is defined (synapses of one of the at least one subset of synapses are called "entangled synapses" in the following)
- at least one evaluation component configured to update (preferably also to determine and administrate) the weight factors of at least a part of the synapses of the at least one neural network the at least one evaluation component being configured to update all weight factors of said subset of synapses (entangled synapses) at the same time during a computational step on the basis of correlated random components when an input signal is applied to one of the synapses belonging to the subset of synapses (entangled synapses) and the at least one evaluation component being configured to update the weight factors of synapses belonging a group of synapses (unentangled synapses) not belonging to the at least one subset of (entangled) synapses individually on basis of an uncorrelated random component when an input signal is applied to a synapse belonging to said group of synapses (unentangled synapse)

By dividing the plurality of synapses of a neural network into at least one subset, possibly several distinct subsets, of entangled synapses and a group of unentangled synapses it is possible to build robust neural networks which can be trained very fast. By introducing a stochastic component into the weight factors of the synapses overfitting is avoided. Furthermore, significantly less training data are necessary than is the case with known neural networks, e.g., only a hundred training pictures instead of a thousand training pictures.

In other words, at least two synapses are called "entangled" if the weight factors of these at least two synapses are updated by the computer system and method at the same time during a computational step on the basis of correlated random components when an input signal is applied to one of the synapses belonging to the subset of synapses. It is of course possible to consider synapses belonging to a first subset of entangled synapses as entangled with each other and to consider synapses belonging to a second subset of entangled synapses as entangled with each other although the synapses of the first subset are not entangled to synapses of the second subset and vice versa. Consequently, a synapse is "entangled" if there is at least one other synapse which satisfies the criteria formulated above (being updated simultaneously using correlated random components).

Two synapses are called "unentangled" if the weight factors of these at least two synapses are updated by the computer system and method individually on basis of an uncorrelated random component when an input signal is applied to one of the at least two synapses.

It is the role of the evaluation component to update the weight factors of at least part of the synapses of the neural network, preferably of all of the synapses if there is no other evaluation component present. It can also be the role of the evaluation component to store weight factors and/or to get random components, e.g., from a RNG or a PRNG, and/or to compute correlated random components based on random components.

It should be noted that if there is more than one neural network implemented in a computer system it is possible that there is a single evaluation component for all of the implemented neural networks or there are several evaluation components for the implemented neural networks, in particular, there could be a evaluation component for each of the implemented neural networks.

In a second aspect the invention suggests a method for operating a computer system (in particular a computer system as described above) on which at least one neural network is implemented, wherein said at least one neural network determines as output at least one output value from at least one input value provided as input, comprising at least the steps of:

the at least one implemented neural network determining at least one output value from at least one input value provided as input, wherein there is defined a plurality of weight factors which are adjustable by training the at least one neural network and wherein each weight factor is assigned to a synapse of an artificial neuron of the at least one neural network defining at least one subset of synapses of the at least one neural network (entangled synapses)

updating during a computational step all weight factors of said subset of (entangled) synapses at the same time on the basis of correlated random components when an input signal is applied to one of the synapses belonging to said group of synapses (entangled synapses) and updating the weight factors of synapses belonging to said groups of synapses (unentangled synapses) individually on basis of an uncorrelated random component when an input signal is applied to a synapse of said group of synapses (unentangled synapse)

In a third aspect the invention suggests a method for training of a neural network to be implemented in a computer system of at least one of the described embodiments or to be used in a method of at least one of the described embodiments wherein the weight factors of the at least one subset of synapses are determined by solving the equation:

$$d\omega_{i_1 i_2 \ldots i_d} = -\eta(t)\left(\frac{\partial \mathcal{L}}{\partial t} + \nu(t)\frac{\partial \mathcal{L}}{\partial \omega_{i_1 i_2 \ldots i_d}} + \frac{1}{2}\sigma^2(t)\frac{\partial^2 \mathcal{L}}{\partial \omega^2_{i_1 i_2 \ldots i_d}}\right)dt + \xi(t)\frac{\partial \mathcal{L}}{\partial \omega_{i_1 i_2 \ldots i_d}}d\mathbb{B}_t \quad (1)$$

or by solving an equation derived from this equation, where $\mathbb{B}_t$ denotes Brownian motion or Wiener process $i_1\ i_2 \ldots i_d$ denote multi-indices $\eta$, $\sigma$, $\xi$, $\nu$ denote learning parameters to be chosen as known in the art $\mathcal{L}$ denotes quality w denotes a weight factor As the weight factors contain stochastic contributions it is not possible to use classical learning algorithms because they will provide wrong results with high probability. By using the above-described approach effective learning algorithms can be realised in spite of the stochastic updating of the weight factors. Furthermore the number of test data required for training of the neural network can be significantly reduced due to the stochastic components. By way of example it was possible to train neural networks using up to 90% less learning data compared to what is usually required and the neural networks provided significantly more accurate results than was the case with usual neural networks.

As an alternative to the formula given above the Hamiltonian dynamics approach described below can be used.

In a fourth aspect the invention suggests a computer program which when the program is executed by a computer system causes the computer system to be configured according to claim 1 or any claim dependent thereon or to carry out the method according to claim 8 or any claim dependent thereon.

In the present disclosure the term "computer system" denotes any arrangement of at least one computer with at least one computational unit (such as CPU, kernel, core, . . . ) and the corresponding periphery wherein the computer system is able to operate a neural network implemented in the computer system. In particular, the computer system can comprise one or several computers, each possibly having several computational units.

In the present disclosure the term "evaluation component" denotes a computational unit which is suitable and configured to execute the invention disclosed herein. In particular, the evaluation component can be a single computational unit or it can be integrated into a computational unit. Possibly, the evaluation component can be implemented in a distributed computer system In the present disclosure the term "computational step" denotes a period defined by a duration of time (e.g., in milliseconds), by an executed processing performance (e.g., a fixed or variable number of floating comma operations or CPU-cycles), or by a completed task (e.g., computation of a result value on basis of an inputted input signal). In neural networks which contain feedback or which are involved in a group of networked neural networks a definition by way of a duration of time (either by a time constraint or by an executed processing performance) can be advantageous. In pure feedback-networks it can be advantageous to define a computational step as a completed task (i.e., a computation of a result value from an inputted input signal).

The term "multiplicative operation" is used in connection with the present disclosure in the mathematical sense and can refer to any algebraic structure in which a multiplicative operation can be carried out. In an exemplary embodiment the multiplicative operation can be a multiplication the result of which is a scalar.

The term "additive operation" is used in connection with the present disclosure in the mathematical sense and can refer to any algebraic structure in which an additive operation can be carried out. An additive operation can be an integration operation, e.g., a classical addition, a classical integral, a modulo addition, etc. In an exemplary embodiment the additive operation can be the addition of two scalars.

It should be noted that it is possible that the group of synapses (unentangled synapses) not belonging to the at least one subset of (entangled) synapses, i.e., the synapses which are updated individually on basis of an uncorrelated random component when an input signal is applied to a synapse belonging to said group of synapses (unentangled synapse) can have a greater number of synapses, a smaller number of synapses or an equal number of synapses compared to the subset of entangled synapses, or it could have zero synapses (in this case all of the synapses of the neural network are entangled synapses). However it is not possible that the subset of entangled synapses has less than at least two synapses, of course, in most cases there will be a large number of entangled synapses.

DESCRIPTION OF EMBODIMENTS

In an embodiment the computer system comprises a plurality of computational units which are operated in parallel. In this way performance of the neural network can be increased.

In such an embodiment a computational unit could be assigned to a defined group of neurons of the neural network. By using the evaluation component and the determination of the weight factors of the entangled synapses (which can be arranged in a distributed way over the whole neural network) done by the evaluation component, operation of the neural network can be massively parallelised reaching a high degree of exploitation of the capacity of the computer system.

In an advantageous embodiment of the computer system and method it is possible that for each neuron of the neural network an output value is determinable on basis of input signals applied to synapses of the neuron by means of the weight factors which are assigned to the synapses, an integrating function of the neuron and a threshold function of the neuron, which output value forms an input signal for at least one synapse of a different neuron of the neural network or forms a component of the result value, wherein the at least one result value can be computed by the neural network on basis of the at least one input value applied to a defined group of synapses by progressive computation of the output values of the neurons. Such a neural network can be adapted to a given use by lots of parameters.

In an analogous embodiment of the method for each neuron of the neural network an output value is determined on basis of input signals applied to synapses of the neuron by means of the weight factors which are assigned to the synapses, an integrating function of the neuron and a threshold function of the neuron, which output value forms an input signal for at least one synapse of a different neuron of the neural network or forms a component of the result value, wherein the at least one result value is computed by the neural network on basis of the at least one input value applied to a defined group of synapses by progressive computation of the output values of the neurons.

In an embodiment the computer system is configured to change the group assignment of the at least one defined subset of entangled synapses between two computational steps. In this way stability of the neural network can be increased and overfitting can be avoided in a better way. Change of the subsets can be effected, by way of example, by use of a stochastic pattern wherein present weight factors of the synapses are used but the further (stochastic) updating of the weight factors is done based on the new group assignment.

In an analogous embodiment of the method the group assignment of the at least one defined subset of entangled synapses is changed at least once between two computational steps.

In an embodiment of the method all weight factors which were assigned the same random value during a randomised initialisation of the neural network are assigned to a joint subset of entangled synapses, preferably by the evaluation component. By way of example, in particular for very large neural networks having lots of synapses, by choosing the number of synapses (e.g., $10^{10}$ synapses or more) and by choosing a random number generator (which, e.g., generates random numbers having $10^5$ digits) it is possible to quickly and directly influence a stochastic distribution of the subsets without the need to exactly define the number of subsets or their size.

In preferred embodiments of the computer system and method the correlated random components $$(z_i^C)$$

are created out of uncorrelated random components ($z_i$) by using a predetermined operation, preferably by creating weighted sums of the uncorrelated random components ($z_i$).

It is to be understood that the evaluation component obtains a stream of vectors comprising random components provided by the RNG or PRNG. Out of some of these vectors, vectors comprising correlated random components are determined, e.g., as described below.

In an embodiment of the computer system and method vectors, the elements of which are correlated random components, are created out of uncorrelated random components by the following formula:

$$\mathcal{C}\vec{z} = \vec{z}^{C} \tag{2}$$

where $$\mathcal{C} = \begin{pmatrix} C_{11} & C_{12} & \cdots & C_{1N} \\ \vdots & \ddots & \vdots & \vdots \\ C_{N1} & C_{N2} & \cdots & C_{NN} \end{pmatrix} \tag{3}$$

denotes a symmetrical matrix which is called correlation matrix $\mathcal{C}$, and $$\vec{z} = \begin{pmatrix} z_1 \\ z_2 \\ \vdots \\ z_N \end{pmatrix} \vec{z}^{C} = \begin{pmatrix} z_1^C \\ z_2^C \\ \vdots \\ z_N^C \end{pmatrix} \tag{4}$$

denote vectors $\vec{z}$, $\vec{z}^C$ the components of which are uncorrelated random components $z_1, \ldots, z_N$ and correlated random components $$z_1^C, \ldots, z_N^C,$$

respectively, wherein creation of correlated random components $$z_1^C, \ldots, z_N^C$$

is effected by forming linear combinations $$z_k^C = C_{k1} z_1 + \ldots + C_{kN} z_N$$

of the uncorrelated random components $z_1, \ldots, z_N$ and rows $C_{k1}, \ldots, C_{kN}$ of the correlation matrix $\mathcal{C}$. By way of example the number of components of vectors $\vec{z}$ and $\vec{z}^C$ can be several hundred thousand or several million.

Preferably, the entries of the correlation matrix $\mathcal{C}$ and/or the random components $z_1, \ldots, z_N$ are random numbers which can be obtained from a RNG or PRNG. It is possible to use the same correlation matrix $\mathcal{C}$ for several or all computational steps. However, it is preferred to use new correlation matrices $\mathcal{C}$ for at least some, preferably for each of the computational steps.

The weight factors of unentangled synapses are updated using uncorrelated random components $z_1, \ldots, z_N$, e.g., by applying an uncorrelated random component to the weight factor. The weight factors of entangled synapses are updated using correlated random components $$z_1^C, \ldots, z_N^C,$$

e.g., by applying a correlated random component to the weight factor. Applying a (correlated) random component to a weight factor can be done, e.g., by way of a multiplicative or an additive operation.

With respect to entangled synapses their weight factors are updated simultaneously even if the synapses belong to neurons which are arranged in different segments of the neural network.

In some embodiments random components in the form of arbitrary random numbers chosen from a given number field such as the real numbers or a pre-defined interval of a number field such as real numbers (such as, e.g. the interval [0, 1] of the real numbers) can be used.

In other embodiments stochastic dynamics (Hamiltonian dynamics approach) is introduced by a unitary time development modelled after Schroedinger's equation and a reduction process whenever a signal is applied to a synapse. In these embodiments, an energy function taking account how far the neural network's result value provided as output is from a desired target output, i.e., an error function, loss function or control function, is created. Using quantum mechanic's standard first quantisation procedure this energy function is translated into a Hamilton operator as is known in standard quantum theory wherein the signals applied to a synapse are viewed in the same role as a position operator in quantum mechanics and the weight factors are viewed in the same role as momentum operators in quantum mechanics, i.e., complex conjugate variables. Each synapse is represented by a state vector in the form of a linear superposition of eigenvectors of the Hamilton operator with different coefficients in the form of random numbers (correlated in the case of entangled synapses, uncorrelated in the case of unentangled synapses). Whenever a signal is applied to the synapse (analogous to a measurement procedure in quantum mechanics) the state vector is collapsed to one of the eigenvectors and the coefficient associated to that eigenvector (the "measurement value" of the measurement procedure) is used to update the weight factor of the synapse. The updating process can be done, e.g., by adding or multiplying the coefficient and the existing weight factor or by using a more complex function.

As already stated it is common in the art to think of the artificial neurons of neural networks as being ordered in segments or layers wherein artificial neurons of one layer inside the neural network receive input signals via their dendrites and synapses from axons of artificial neurons of the preceding segment (layer) and send output values via their axons to dendrites and synapses of the succeeding segment (layer).

In preferred embodiments the computer system and method make use of more than one neural network with the features described above at the same time, i.e., at least two neural networks are working in parallel at a given time. It is possible to have two or more coupled neural networks work on different parts of the same input value thereby speeding up computation.

In these embodiments it is possible to crosslink at least some of the artificial neurons of a segment of a given neural network with neurons of at least one segment of another neural network by having axons of one neural network reach across neural networks to send signals to synapses of the other neural network. As it is to be expected that the different neural networks have different numbers of artificial neurons in the segments that are to be linked, it is preferred that for each of the segments of another neural network which is to be linked to, there is provided a separate dendrite in an artificial neuron of the neural network with as many synapses as there are artificial neurons in the segment of the other neural network. It is preferred that the coupling between different artificial neural networks is less dense (with respect to the number of connections) than the coupling between artificial neurons of different segments of one neural network.

In the preferred embodiments described in the preceding paragraph it is possible to provide a joint evaluation component for all of the coupled neural networks thus forming a joint neural network which can be viewed as consisting of a sequentially arranged plurality of parallelly working coplanar segments of artificial neurons.

Artificial neural networks 1 can be shown as a plurality of artificial neurons 2 which are connected together into a network by communication channels. In order to denote the different elements of the neural network 1 designations are used herein which are derived from the biological designations of corresponding components of natural neural networks such as, by way of example, "synapse", "dendrite" or "axon". These designation only serve to facilitate understanding and are not to be construed in a limiting way.

Figure 1:
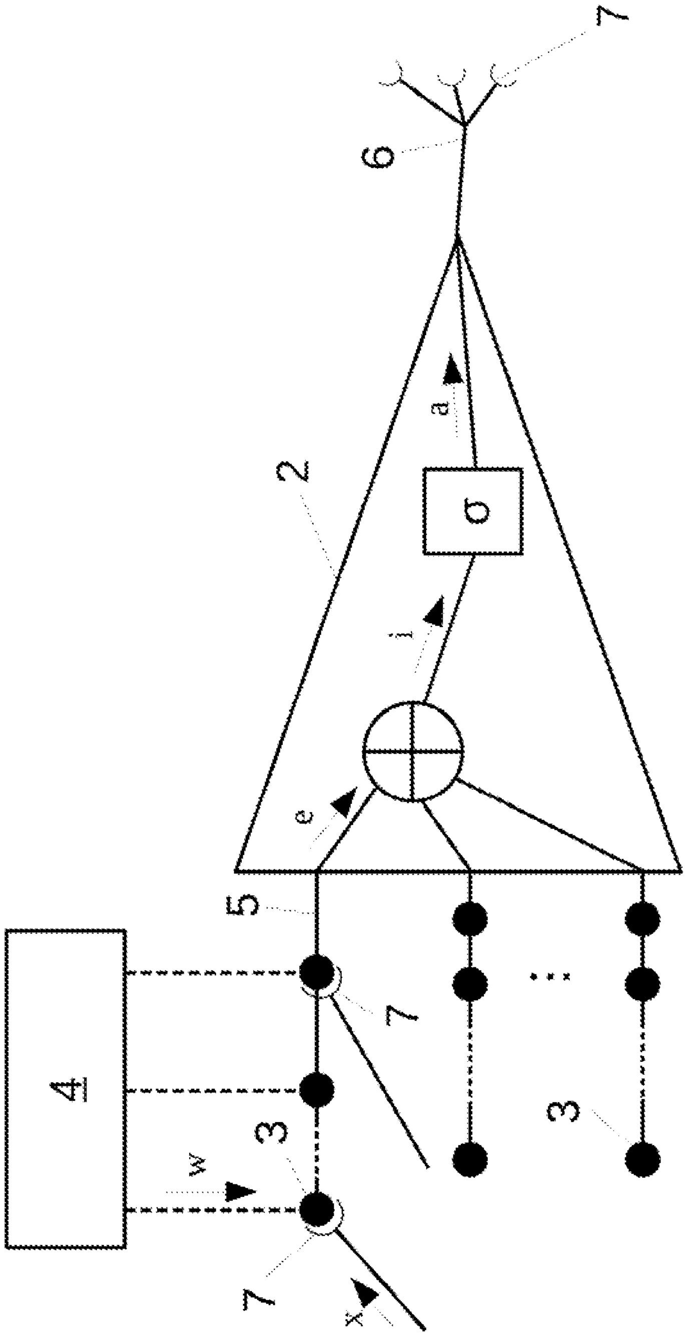
FIG. 1: a schematic presentation of a model of an artificial neuron

FIG. 1 shows a schematic presentation of an artificial neuron 2 which can be used for building a neural network 1.

The neuron 2 comprises a plurality of synapses 3 which are arranged on several dendrites 5. Each dendrite 5 comprises at least one synapse 3 wherein preferably a plurality of synapses 3 is provided on a dendrite 5, e.g., in a linear arrangement. The dendrites 5 can have a single synapse 3 or they can have branchings which, for clarity, are not shown in the figures. The presentation of the dendrites 5 with synapses 3 arranged thereon is only meant to facilitate understanding. In an actual embodiment (realised mathematically or by way of programming) the arrangement of synapses 3 is defined solely by mathematical or logical connections and formulas.

Furthermore the neuron 2 comprises an axon 6. The axon 6 can branch into a plurality of axon endings 7 wherein each axon ending 7 leads to a synapse 3 of a further neuron 2 in the neural network 1.

To each synapse 3 at least one axon ending 7 is assigned by which an input signal x can be applied to the corresponding synapse 3. Depending on the position of the synapse 3 (and of the neuron 2) the input signal x can origin either from an axon ending 7 of a different neuron 2 of the neural network 1 or it can be a component element of an inputted input signal X coming from the "outside" of the neural network 1. Furthermore, a weight factor w is assigned to each synapse 3. The weight factors w of the synapses 3 are determined by an evaluation component 4 according to rules described below and are provided to that region of the computer system in which the corresponding neuron 2 of the artificial neural network 1 is processed. If at least one input signal x is applied to at least one synapse 3 of a dendrite 5 a value is determined on the basis of the weight factors w and mathematical rules which serves as input of an integration function $\oplus$ of the neuron 2 and which is herein denoted as argument of integration e.

In order to determine the argument of integration e of a dendrite 5 the input signal x of each synapse 3 of the dendrite 5 is combined into a weighed input signal by a multiplicative operation with the weight factor w of the synapse 3.

In order to facilitate understanding the inputs signals x and the weight factors w are being described by way of example as scalars in this disclosure. However, this is no prerequisite. The input signals x and the weight factors w could also be defined as tensors of higher rank. It is of significance that the input signals x and the weight factors w are elements of tensor spaces which allow a multiplicative operation and that the products of these multiplicative operations can be summed up in an additive operation.

When all input signals x applied to the synapses 3 of the dendrites 5 have been taken into account and the corresponding arguments of integration e of all dendrites 5 have been determined inside a computational step (this corresponds to a simultaneity), a value of integration i is determined by use of the integration function $\oplus$ which serves as input value of a threshold function $\sigma$. The threshold function $\sigma$ changes the value of integration i into an output value a. The output value can also be zero, e.g., if the value of integration i does not meet the conditions defined by the threshold function $\sigma$. When an output value a is present it is applied to the corresponding synapses 3 of other neurons 2 of the neural network 1 by the axon endings 7.

In the simplest case the integration function $\oplus$ combines the individual arguments of integration e of all dendrites 5, however more complex integration functions $\oplus$ can be used. Integration functions $\oplus$ in connection with artificial neural networks 1 are known in the art.

Also, threshold functions $\sigma$ are per se known in the art, wherein, e.g., a step function or a sigmoid can be used.

Instead of waiting for the computation of all values of all input signals x of the synapses 3 of the neuron 3 in each computational step, the computation can also be done continuously. As soon as a first input signal x is applied at one of the synapses 3 a corresponding argument of integration e is determined based on the weight factor w and based on the output of this operation a value of integration i is determined. In case of a single input signal x, however, the value of integration i will generally be too small such that the threshold function $\sigma$ will give no output value a (or an output value a=0). Only when the number of applied input signals x or the weighted arguments of integration e generated therefrom are large enough, respectively, the threshold function $\sigma$ can be "overcome" and an output value a can be outputted. In this way even in complex, recurrent or higher-dimensional neural networks 1 or in groups of networked neural networks 1 a high-grade parallelisation of the neural network 1 can be realised on several networked systems.

The modelling of the neuron 2 shown in FIG. 1 is generally built after the pyramidal cells in the cortex of mammal brains. However, it must be pointed out that the teachings of the present disclosure are not limited to the use of such pyramidal cells but neurons 2 of a different type could be used which comprise at least on input for an input signal x (synapse 3) and at least one output for an output value a (axon 6). In some embodiments neurons 2 of different types can be used together in a single neural network 1. By way of example neurons 2 which are built after pyramidical cells could be used in the neural network 1 together with neurons 2 which are built after stellate cells.

A neural network 1 according to the present disclosure can comprise a plurality of neurons 2 organised into segments 8 arranged in series such that the number of synapses 3 on a given dendrite of a given neuron 2 corresponds to the number of neurons 2 of a preceding segment 8. It is possible to have parallel segments 8 of the neural network 1 which work simultaneously. It is possible to provide more than one dendrite and to provide each dendrite with a different number of synapses 3. By providing more than one dendrite it is possible to use input of a parallel segment 8 of neurons 2 of the neural network 1 in which the number of neurons 2 might be different. A neural network 1 can be modelled mathematically by a tensor product.

Figure 2:
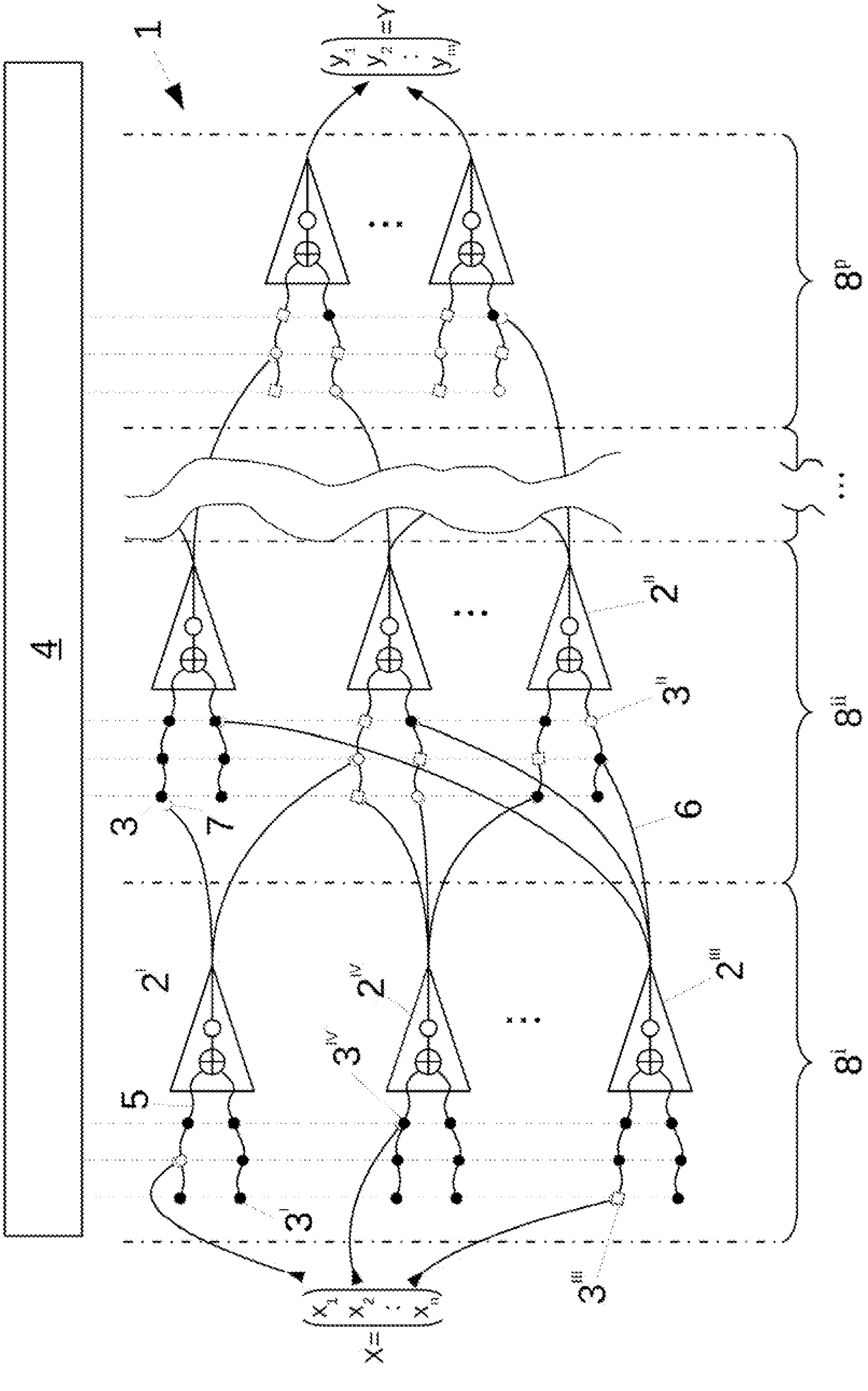
FIG. 2: a schematic presentation of a model of a neural network showing several neurons which are networked by axons and dendrites

FIG. 2 shows a neural network 1 which is built of a plurality of neurons 2 as they were described in connection with FIG. 1. In the shown case each neuron 2 is assigned to a segment $\mathbf{8}^{i}$, $\mathbf{8}^{ii}$ to $\mathbf{8}^{p}$, this assignment, however, is not a necessary feature. It primarily serves to facilitate description and understanding. As many elements occur several times in the neural network 1 the reference signs are provided with superscribed small roman indices in the following if the description refers to a specific element which is shown in the respective Figure. Also in implementation in reality each element (e.g., each neuron 2, each dendrite 5, each synapse 3, etc.) can be uniquely addressed by respective indices. Other than shown there might be one or more parallel segments 8.

Each neuron 2 of the neural network 1 shown in FIG. 2 corresponds essentially to the description given in FIG. 1 above. In a practical realisation the neural network 1 can comprise a multitude of segments 8 (e.g., 10, 100, 1000, or more) wherein each segment 8, in turn, comprises a multitude of neurons 2. Each neuron 2, in turn, comprises a multitude of dendrites 5 (e.g, 10 to 100, or more) which each, in turn, comprise a multitude of synapses 3 (e.g., each 10 to 100 or more). A single neuron 2 can therefore have, e.g., more than 1000, even up to 10000 or more synapses 3. The numbers given above are to be understood as examples and serve to illustrate the complexity that can be reached by a neural network 1. The neural networks 1 described herein are, however, not limited to a specific maximum or minimum size and/or complexity. On the contrary, the teachings of the present disclosure can be adapted as desired.

For clarity the simplified and schematic presentation of FIG. 2 corresponds to a two-dimensional neural network 1, i.e., a neural network 1 which can be presented in a plane and in which only one axon ending 7 is assigned to each synapse 3. The teachings of the present disclosure, however, are applicable to higher-dimensional neural networks 1 and not limited to two-dimensional structures. By way of example the present teachings can also be applied to higher-dimensional neural networks 1 which, although they can be mathematically expressed and software-technical programmed, are not suitable for a structured two-dimensional presentation. In particular, this also refers to recurrent neural networks 1 and/or neural networks 1 in which several axon endings 7 of different axons 6 can be assigned to a single synapse 3.

In FIG. 2 only a few neurons 2 are shown and the number of dendrites 5 and synapses 3 has also been massively reduced for clarity. As is per se known for neural networks 1 the neural network 1 generates as output at least one result value Y based on at least one input value X provided as input. The input value X can comprise several values $(x_1, x_2, \ldots, x_n)$ which are shown in the presentation of FIG. 2 as a vector. However, the input value X could also be present in the form of a (possibly multi-dimensional) matrix or an arbitrary higher-dimensional tensor. The result value Y provided as output can also comprise several values $(y_1, y_2, \ldots, y_n)$ which, by way of example, can also be represented as a vector or a (possibly multi-dimensional) matrix or an arbitrary higher-dimensional tensor. Also, the result value Y can be generally defined as an element of a tensor space wherein the tensor space of the result value Y can be different from the tensor space of the input value X provided as input.

Depending on type and function of the neural network 1 the input values X can represent an arbitrary task for which the neural network 1 is to generate a result value Y as an output. In an illustrative example the task could be, e.g., a medical measured pattern of a person and the result could be a diagnosis. Or the task could represent historical data and the result could represent a prognosis. However, application of the neural networks 1 disclosed herein is not limited to such examples. On the contrary, they can be used generally and almost without limit for arbitrary tasks which can be modelled as a transformation of an input into an output.

During inference operation and training of the neural network 1 the weight factors w of all synapses 3 are determined by a central evaluation component 4 and are provided to the other computational units 9 involved in the operation of the neural network 1 (computer, processors, kernels, cores). The evaluation component 4 has a special role in connection with the operation of a neural network 1 disclosed herein as will be explained in the following. It is possible that several evaluation components 4 are provided in a neural network 1 wherein each evaluation component 4 administrates the weight factors w of a subset of synapses 3 if this turns out to be advantageous, e.g., with respect to performance.

The synapses 3 of the neural network 1 are structured in different subsets. This is illustrated in FIG. 2 by different ways of presentation of the synapses 3: Synapses 3 of a first group of unentangled synapses 3 are shown as full dots, e.g., synapse 3' of the first neuron 2' of first segment $\mathbf{8}^{i}$. Synapses 3 of a first subset of entangled synapses 3 are shown as empty dots, e.g., synapse 3" of the last neuron 2" of second segment $\mathbf{8}^{ii}$. Entangled synapses 3 of a second subset are shown as empty quadrangles, e.g., synapse 3'" of the last neuron 2'" of first segment $\mathbf{8}^{i}$.

The different subsets of synapses 3 differ with respect to the type of updating of their weight factors w. Apart from the first group (full dots) which comprises independent, unentangled synapses 3 the other subsets comprise a group of entangled synapses 3 each. The evaluation component 4 uses special rules when determining the weight factors w of entangled synapses 3 as described below and with respect to which determination of a weight factor w of a single synapse 3 of this subset has simultaneous effects on the weight factors w of all other synapses 3 of this group. In the first group of unentangled synapses 3 (full dots) determination of the weight factor w of a single synapse 3 of this subset does not have any effect on determination of weight factors w of the other synapses 3 of this group. It is not necessary that such a first group of unentangled synapses 3 is present and according to the teachings disclosed herein it is possible to create neural networks 1 which only comprise entangled synapses 3 (of different subsets). In an alternative interpretation each unentangled synapse 3 can be interpreted as an independent subset of cardinality of one. It is important that there is at least one subset of at least two entangled synapses 3 present in the neural network 1. It is possibly that unentangled synapses 3 are grouped into more groups than one.

The number of subsets of entangled synapses 3 and their share of the total number (and thereby the number of remaining, unentangled synapses 3 which can be thought of as belonging to the group of unentangled synapses 3) can be defined before initialisation by choosing parameters of the neural network 1. The distribution of synapses 3 of the different subsets of the neurons 2 of the neural network 1 can happen during initialisation of the neural network, e.g., in a randomised way. It is possible to define requirements for the distribution or a distribution can be used which has proved to be effective in an existing neural network 1. During initialisation of the neural network 1 it is common to assign a random number as weight factor w to each synapse 3. The number of possible random numbers can be smaller than the number of synapses 3 (e.g., there could only be 10000 random numbers for 10000000 synapses 3). If all synapses 3 which received the same random number during initialisation as a weight factor w are collected as a subset of entangled synapses 3, then the size and the number of subsets and the distribution of synapses 3 of the subsets within the neural network 1 can be influenced randomly on the basis of few parameters.

In an embodiment the distribution of subsets stays constant in a working (i.e., training or inference operation) neural network 1, i.e., the entanglement of the synapses 3 does not change in the running neural network 1. However, this is not a prerequisite as it is possible to make changes to the subsets during inference operation or training of the neural network 1. Possibly, the definition of subsets can be changed in a regular or randomised way during inference operation and/or training of the neural network 1.

Both, during training (which will be described in detail later) and during regular inference operation of the neural network 1, the evaluation component 4 determines the weight factors w of all synapses 3 of the neural network 1. In doing so the weight factors w are updated by use of a random component, in particular a random number. As soon as an input signal x is applied to a synapse 3 (e.g., when value $x_2$ of input signal X shown in FIG. 2 is applied to unentangled synapse $\mathbf{3}^{iv}$ of neuron $\mathbf{2}^{iv}$) the evaluation component 4 determines a new weight factor w which is assigned to this synapse $\mathbf{3}^{iv}$ and is provided to that computer system which works on the corresponding neuron $\mathbf{2}^{iv}$. This approach generates a stochastic uncertainty in the whole neural network 1. It has been found that this stochastic uncertainty is advantageous and, in particular, improves stability of the neural network 1, increases speed of learning and reduces error susceptibility. However, this approach represents a special mathematical challenge for training of the neural network 1 since known learning algorithms no longer work with stochastic components.

In the following at first the updating of the weight factors w during normal inference operation of the neural network 1 is described. Then learning algorithms and training of the neural network 1 will be described in detail.

Updating weight factors w can happen during inference operation of the neural network, e.g., according to any stochastic process such as a Wiener process, a Poisson process or a similar process. For each update of a weight factor w a random component (in particular a random number) is determined and the weight factor w is updated according to the specification of the chosen stochastic process. The stochastic process also defines to which extent the random component updates the weight factor w.

If the evaluation component 4 takes on weighing an unentangled synapse 3, an uncorrelated random component is determined and the weight factor w is updated according to the chosen stochastic process based on the random component.

In the present disclosure the term "uncorrelated random component" denotes a number or a group of numbers which is or are generated by a physical or deterministic random number generator (i.e., a pseudo random number generator—PRNG). Fidelity of the used random number generator should be sufficiently high to guarantee that effects of the generated random numbers cannot be distinguished from effects of "real" random numbers in the framework of the size and complexity of the neural network 1. Usable (pseudo-)random number generators are known in the art.

If an input signal x is applied to a synapse 3 of a subset of entangled synapses 3 in the neural network 1 the evaluation component 4 determines the weight factors 4 of all synapses 3 of this subset at the same time, i.e., simultaneously, by generating a number of correlated random numbers (or correlated pseudo random numbers) the number of which corresponds to the number of weight factors w of all synapses 3 of the subset. Preferably, in order to generate the correlated random numbers $$z_i^C,$$

random numbers $z_i$ are multiplied by a correlation matrix $\mathcal{C}$ in the following way:

$$C\vec{z} = \vec{z}^C \tag{5}$$

where $$C = \begin{pmatrix} C_{11} & C_{12} & \cdots & C_{1N} \\ \vdots & \ddots & \vdots & \vdots \\ C_{N1} & C_{N2} & \cdots & C_{NN} \end{pmatrix} \tag{6}$$

denotes a symmetrical matrix which is called correlation matrix $\mathcal{C}$, and $$\vec{z} = \begin{pmatrix} z_1 \\ z_2 \\ \vdots \\ z_N \end{pmatrix} \vec{z}^C = \begin{pmatrix} z_1^C \\ z_2^C \\ \vdots \\ z_N^C \end{pmatrix} \tag{7}$$

denote vectors $\vec{z}$, $\vec{z}^C$ the components of which are uncorrelated random components $z_1, \ldots, z_N$ and correlated random components $$z_1^C, \ldots, z_N^C,$$

respectively, wherein creation of correlated random components $$z_1^C, \ldots, z_N^C$$

is effected by forming linear combinations $$z_k^C = C_{k1}z_1 + \ldots + C_{kN}z_N$$

of the uncorrelated random components $z_1, \ldots, z_N$ and rows $C_{k1}, \ldots, C_{kN}$ of the correlation matrix $\mathcal{C}$.

The weight factors w of unentangled synapses 3 are updated using uncorrelated random components $z_1, \ldots, z_N$, e.g., by adding a random component $z_k$ to the weight factor w. The weight factors w of entangled synapses 3 are updated using correlated random components $$z_1^C, \ldots, z_N^C,$$

e.g., by adding a random component $$z_k^C$$

to the weight factor w. With respect to entangled synapses 3 their weight factors w are updated simultaneously even if the synapses 3 belong to neurons 2 which are arranged in different segments 8 of the neural network 1.

Both, during "normal" inference operation of the neural network 1 and during training, when an input signal x is applied to a synapse 3, a weight factor w belonging to this synapse 3 (or the random value with which this weight factor w must be updated) is called by the evaluation component 4 and is used by the corresponding computational unit 9 for further operation. Addressing of synapses 3 can be done by indices. In order to generate the new weight factor w the corresponding random component is entangled with the old weight factor w by a multiplicative operation (in the simplest case multiplication of two numbers).

Figure 3:
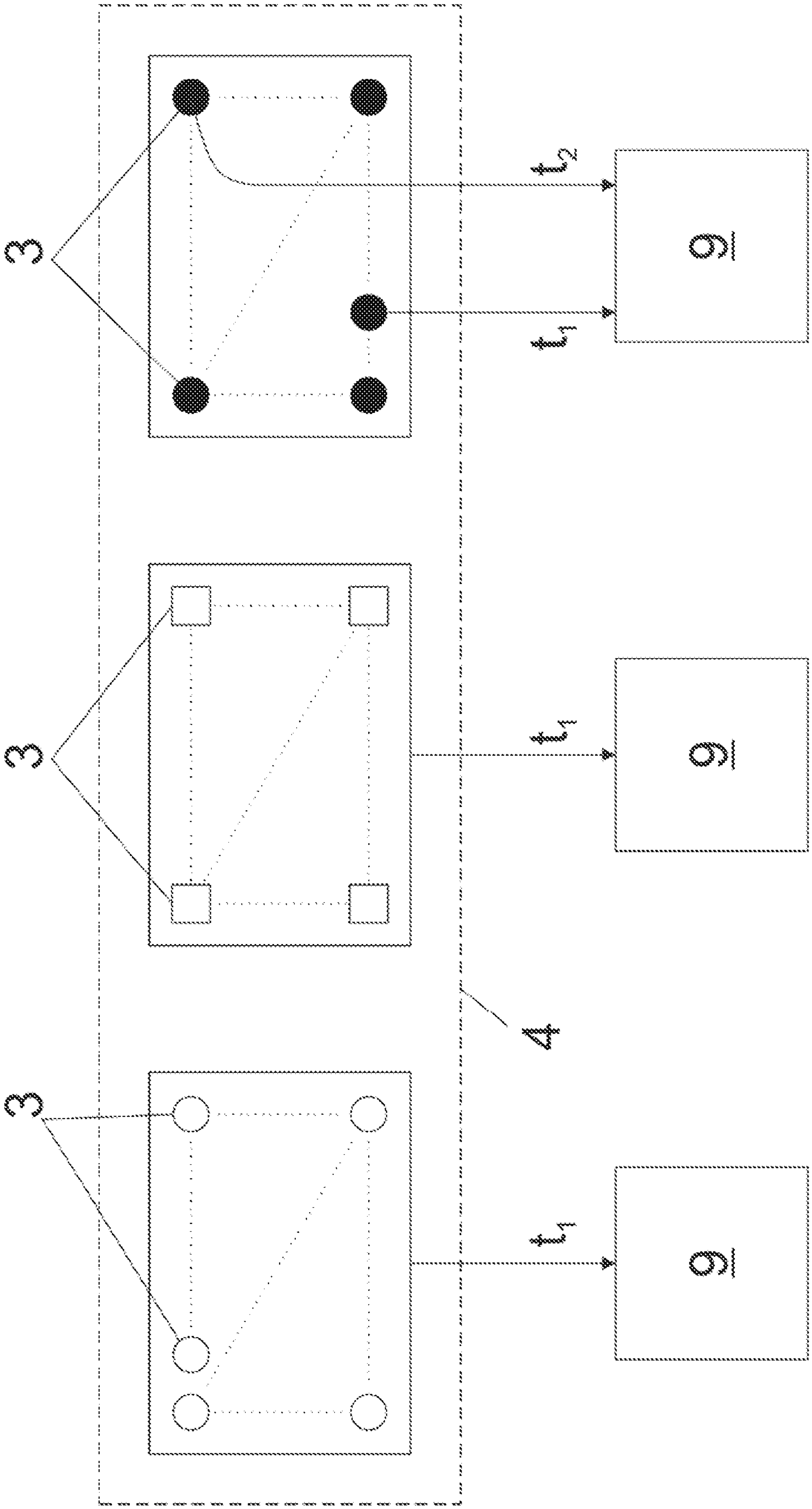
FIG. 3: a schematic view of the step of updating the weight factors of synapses of the artificial neural network

The step of updating the weight factors w of synapses 3 of the neural network 1 is shown in FIG. 3. The different types of synapses 3 are shown using the same symbols as discussed with respect to FIG. 2. In this example only three different computational units 9 are shown. In reality a larger number might be used.

The evaluation component 4 administrates all of the synapses 3 of the neural network 1, i.e., it keeps track which of the synapses 3 belong to which subset or group and, in some embodiments, changes the assignment of the synapses 3 to the subsets or groups. It also stores all weight factors w of the synapses 3. The arrows running from the subsets containing entangled synapses 3 to the computational units 9 signify the following features:

One computational unit 9 is assigned to each of the subsets of entangled synapses 3. Other than shown the computer system could be configured to update the weight factors w of unentangled synapses 3 using different computational units 9, i.e., in this case there is no computational unit 9 assigned solely to update the weight factors w of unentangled synapses 3.

All of the weight factors w of the synapses 3 of one subset of entangled synapses 3 are updated simultaneously at a time $t_1$. Other than shown it might be the case that the weight factors w of synapses 3 of different subsets of entangled synapses 3 are updated at a different time. Also, it is to be understood that the updating step is repeated many times.

The weight factor w of synapses 3 belonging to the group of unentangled synapses 3 are individually updated at different times $t_1$, $t_2$. Of course, the time $t_1$ in this step does not have to be the same as time $t_1$ discussed above.

Ongoing updating of the weight factors w by using stochastic components (e.g., random numbers) prevents application of classical learning algorithms which are based on partial derivatives of a transfer function of the neural network 1 according to the weight factors w. It was therefore necessary to develop a new learning algorithm for training of the neural network 1 which will be explained in the following.

Figure 4:
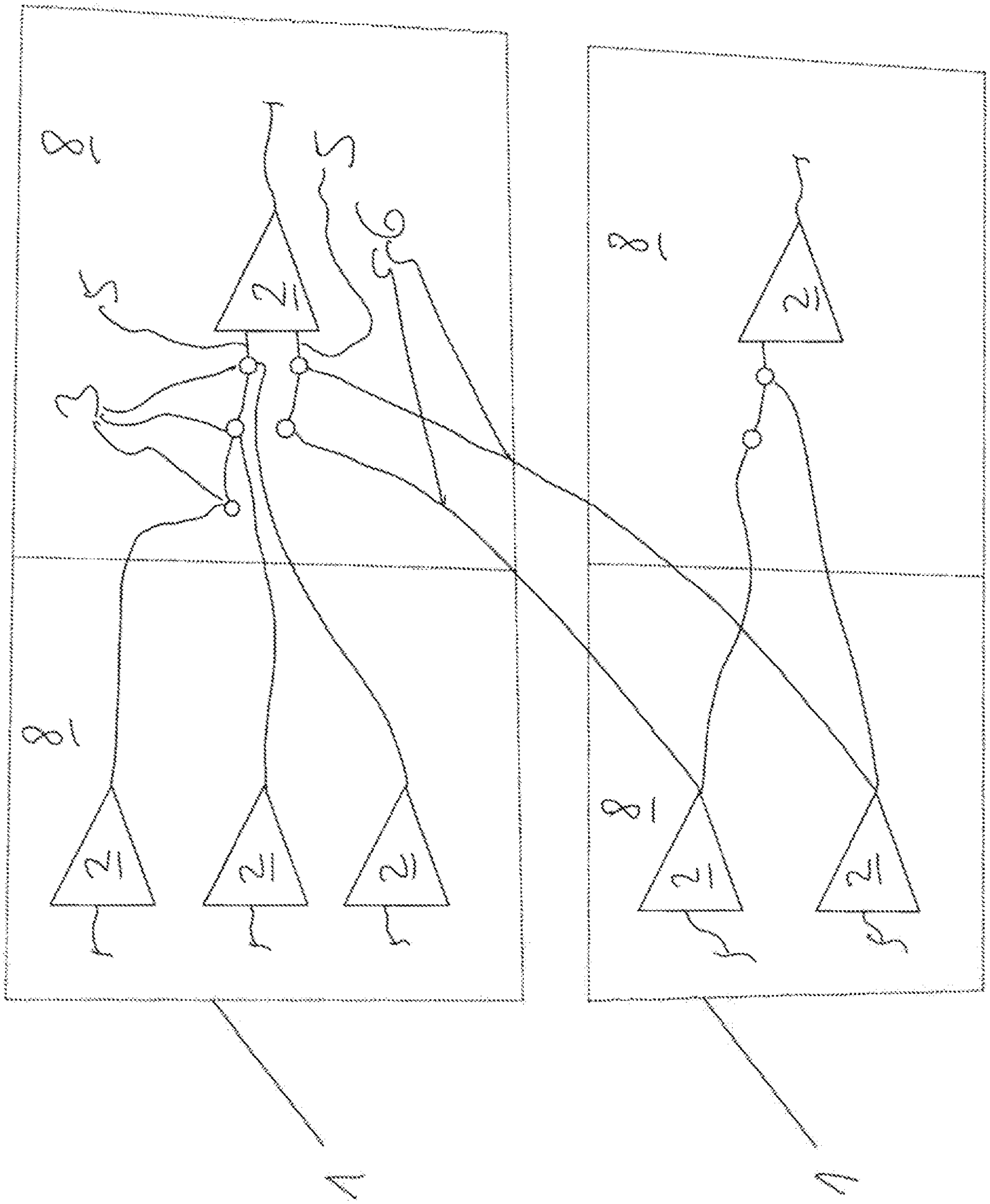
FIG. 4: a schematic view of two coupled neural networks The structure of an artificial neural network 1 will be explained in the following based on the figures which graphically show the modelling of the neural network 1. On basis of the shown modelling, the description disclosed herein and the mathematical basics disclosed herein it is possible for a person skilled in the art to practice the teachings of the present disclosure by choosing suitable computer systems and a corresponding programming.

FIG. 4 shows an embodiment in which the computer system and method make use of more than one neural network 1 with the features described above at the same time, i.e., at least two neural networks 1 are working at a given time. The parallel neural networks 1 are coupled by crosslinking at least some of the artificial neurons 2 of a segment 8 of a given neural network 1 with artificial neurons 2 of at least one segment 8 of another neural network 1 by having axons 6 of one neural network 1 reach across neural networks 1 to send signals to synapses 3 of the other neural network 1. As it is to be expected that the different neural networks 1 have different numbers of artificial neurons 2 in the segments 8 that are to be linked, for each of the segments 8 of another neural network 1 which is to be linked to, there is provided a separate dendrite 5 of an artificial neuron 2 of the neural network 1 with as many synapses 3 as there are artificial neurons 2 in the segment 8 of the other neural network 1. It is preferred that the coupling between different artificial neural networks 1 is less dense (with respect to the number of connections) than the coupling between artificial neurons 2 of different segments 8 of one neural network 1.

In the preferred embodiment described in the preceding paragraph it is possible to provide a joint evaluation component 4 for all of the coupled neural networks 1 thus forming a joint neural network 1 which can be viewed as consisting of a sequentially arranged plurality of parallelly working coplanar segments 8 of artificial neurons 2.

Traditional ("classical") artificial neural networks usually use a learning algorithm which is based on determining a gradient of a quality of a result based on the weight factors w. As quality a difference between the result of a computation and a target value is used. For training of the neural network 1 an inputted input signal X is applied to the neural network 1 for which input value X there exists a known target result value Y' (also called target value). The difference between the result value Y and the target result value Y' represents the quality of the result. The individual weight factors w are then updated in the sense of a minimisation task.

In a general definition the learning algorithm can be represented by the formula:

$$d\omega_{ij}^{(l)}(t) = -\eta\frac{\partial\mathcal{L}}{\partial\omega_{ij}^{(l)}(t)}dt \tag{8}$$

wherein l is an index of a layer of the neural network 1 i is an index of a neuron 2 of the layer j is an index of a synapse 3 of the layer $\mathcal{L}$ is quality $$w_{ij}^{(l)}$$

is a weight factor wη is a learning parameter

This formula leads to a minimisation task the solution of which is used to determine the updated weight factors w.

However, as soon as the weight factors w are applied with a stochastic component (as is the case in the neural networks 1 disclosed herein by the stochastic updating of the weight factors w) it is no longer possible to solve Equation 8 by using classical analysis. Therefore a more complex approach which is based on Ito's lemma has been chosen and which can be represented in the case of a two-dimensionally representable neural network 1 by the following equation (or by an equation derived from this equation):

$$d\omega_{i_1 i_2}(t) = -\eta(t)\left(\frac{\partial\mathcal{L}}{\partial t} + v(t)\frac{\partial\mathcal{L}}{\partial\omega_{i_1 i_2}} + \frac{1}{2}\sigma^2(t)\frac{\partial^2\mathcal{L}}{\partial\omega_{i_1 i_2}^2}\right)dt + \xi(t)\frac{\partial\mathcal{L}}{\partial\omega_{i_1 i_2}}d\mathbb{B}_t \tag{9}$$

where $\mathbb{B}_t$ denotes Brownian motion or Wiener process $i_1$ $i_2$ denote indices η, σ, ξ, ν denote learning parameters $\mathcal{L}$ denotes quality w denotes a weight factor During training the updated weight factors w of each subset of entangled synapses 3 is determined by solving Equation 9.

By using Equation 9 the learning algorithm can be applied to numerous different types of neural networks 1 such as recurrent neural networks (RNNs) and LSTM-networks.

For the general case which also allows training of higher-dimensional neural networks 1, equation 9 looks as follows:

$$d\omega_{i_1 i_2 \ldots i_d} = -\eta(t)\left(\frac{\partial\mathcal{L}}{\partial t} + v(t)\frac{\partial\mathcal{L}}{\partial\omega_{i_1 i_2 \ldots i_d}} + \frac{1}{2}\sigma^2(t)\frac{\partial^2\mathcal{L}}{\partial\omega_{i_1 i_2 \ldots d}^2}\right)dt + \xi(t)\frac{\partial\mathcal{L}}{\partial\omega_{i_1 i_2 \ldots i_d}}d\mathbb{B}_t \tag{10}$$

where $\mathbb{B}_t$ denotes Brownian motion or Wiener process $i_1$ $i_2$ . . . $i_d$ denote multi-indices η, σ, ξ, ν denote learning parameters as known in the art $\mathcal{L}$ denotes quality w denotes a weight factor The multi-indices represent the subsets of entangled synapses 3 which, mathematically, can be viewed as tensor components of tensors $w_{i_1 i_2 \ldots i_d}$. The learning parameters η, σ, ξ, ν can depend on the multi-indices and can signify any desired learning parameter known in the art.

Although a mathematical proof of convergence could not be formulated yet for the herein newly disclosed neural networks 1, applicant has already created and tested artificial neural networks 1 according to the teachings disclosed herein for different applications.

Neural networks 1 created, trained and operated according to the invention were extraordinarily performant. By way of example it was possible to train neural networks 1 using an amount of learning data reduced by up to 90% compared to the amount of usually necessary training data and the results provided were significantly more exact than was the case with comparable known neural networks 1.

In order to create and initialise a stable neural network 1 which can be successfully used for a task at hand it is necessary to choose or adjust numerous parameters. This can be done on basis of experience values or by choosing a systematic approach based on trial and error. By way of example some parameter can be chosen in a fixed way before creation such as the number of neurons 2 and synapses 3. The remaining parameters can then be stochastically determined by the system.

However, it can not be stated beforehand with certainty whether such a neural network 1 which has been stochastically parametrised by using user specifications will in fact be usable for the task at hand. Basically, three different scenarios can emerge:

1.) The neural network 1 converges and becomes stable. This can usually be determined after a specific number of learning steps.

2.) The neural network 1 is oscillating and does not find a stable state (no convergence). In this case there is no learning progress.

3.) The neural network 1 diverges and the weight factors w approach infinity.

Only convergent neural networks 1, i.e., neural networks 1 of the first scenario are suited for their task. Therefore, if the computer system recognises that the neural network 1 does not converge (i.e., scenario 2 or 3 is present) a reset (i.e., a new initialisation) is done and the neural network 1 can be started anew, e.g., with new parameters. Examination and renewed initialisation can either be decided and executed by the system independently or can be triggered by user input. Possibly, different neural networks can be used for finding convergent neural networks 1 which are being trained to find suitable and optimal parameterisations.

Possibly, in particular when a network oscillates or a convergent network is to be optimised, specific parameters can be changed during operation as, by way of example, the assignment of synapses 3 to the subsets or parameters or ranges of parameters which concern the generation of correlated random components. It is also possible to train a further neural network for such changes and optimisations.

Everything stated in this disclosure with respect to the computer system is also understood to encompass the method and vice versa.

REFERENCE SIGNS LIST

1 neural network
2 artificial neuron
3 synapse
4 evaluation component
5 dendrite
6 axon
7 axon ending
8 segment
9 computational unit
x input signal
w weight factor
$z_i$ uncorrelated random components $z_i^C$ correlated random components
$\mathcal{C}$ correlation matrix
e argument of integration
i value of integration
$\oplus$ integration function
σ threshold function
a output value
X input value provided as input
Y result value provided as output
$t_1$, $t_2$ different moments of time

What is claimed:

1. A computer system for training and operating an artificial neural network, the computer system comprising:

at least one computational unit; and at least one memory coupled to the at least one computational unit and storing a plurality of weight factors, wherein the at least one computational unit is configured to implement an artificial neural network comprising a plurality of artificial neurons arranged in a plurality of successive segments, the artificial neurons of one segment being connected to artificial neurons of a succeeding segment via dendrites and synapses, each synapse of the artificial neural network having an associated weight factor of the plurality of weight factors, wherein the artificial neural network is configured to determine, as output, at least one result value from at least one input value applied as input by progressive computation of output values of the artificial neurons through the successive segments, wherein at least one subset of the synapses of the artificial neural network is defined, the synapses belonging to the at least one subset being entangled synapses, and the synapses of the artificial neural network not belonging to any of the at least one subset being unentangled synapses, wherein the at least one computational unit is further configured to update the weight factors of the synapses of the artificial neural network in accordance with a stochastic update rule, the stochastic update rule comprising (i) a deterministic drift term that depends on a partial derivative of a quality function L with respect to the weight factor being updated, and (ii) a stochastic diffusion term comprising an increment dBt of a stochastic process Bt, wherein, when an input signal is applied to a synapse belonging to the at least one subset, the at least one computational unit is configured to update all weight factors of all synapses of the at least one subset simultaneously during a single computational step, the increments dBt used to update the weight factors being realizations of correlated random components, the correlated random components being correlated according to a pre-defined correlation structure that is independent of the at least one input value applied as input to the artificial neural network, and wherein, when an input signal is applied to an unentangled synapse, the at least one computational unit is configured to update the weight factor of the unentangled synapse individually, the increment dBt used to update the weight factor being a realization of an uncorrelated random component, the uncorrelated random component being uncorrelated with the random components used to update the weight factor of any other synapse of the artificial neural network.

2. The computer system of claim 1, wherein the at least computational unit includes a plurality of computational units which are operated in parallel, and computational units of the plurality of computational units are assigned to defined groups of artificial neurons of the artificial neural network.

3. The computer system of claim 2, wherein at least two different computational units of the plurality of computational units are assigned to at least two different subsets of the at least one subset of synapses.

4. The computer system of claim 1, wherein for each artificial neuron of the artificial neural network, an output value is determinable on basis of input signals applied to synapses of the artificial neuron by means of the weight factors which are assigned to the synapses, an integration function of the neuron and an activation function of the artificial neuron, which output value forms an input signal for at least one synapse of a different artificial neuron of the artificial neural network or forms a component of the result value to be outputted by the artificial neural network, wherein the at least one result value can be computed by the artificial neural network on basis of the at least one input value applied to a defined group of synapses by progressive computation of the output values of the artificial neurons.

5. The computer system of claim 1, wherein the computer system is configured to change an assignment of the at least one defined subset of synapses between two computational steps.

6. The computer system of claim 1, wherein the computer system is configured to create the correlated random components out of the uncorrelated random components by using a predetermined operation.

7. The computer system of claim 6, wherein the predetermined operation comprises computing, for each correlated random component $z^C_k$, a weighted sum $z^C_k = C_{k1} \cdot z_1 + C_{k2} \cdot z_2 + \ldots + C_{kN} \cdot Z_N$ of uncorrelated random components $z_1, \ldots, z_N$ with coefficients $C_{k1}, \ldots, C_{kN}$ forming the k-th row of a correlation matrix C of the pre-defined correlation structure.

8. The computer system of claim 1, wherein at least two of the artificial neural networks which are working in parallel at a given time are implemented on the computer system and at least some of the artificial neurons of a segment of a given artificial neural network are crosslinked with artificial neurons of at least one segment of another artificial neural network by having axons of one artificial neural network reach across artificial neural networks to send signals to synapses of the other artificial neural network.

9. The computer system of claim 1, wherein the computer system is configured to create the correlated random components out of the uncorrelated random components by creating weighted sums of the uncorrelated random components.

10. The computer system of claim 1, wherein at least two of the artificial neural network which are working in parallel at a given time are implemented on the computer system and at least some of the artificial neurons of a segment of a given artificial neural network are crosslinked with artificial neurons of at least one segment of another artificial neural network by having axons of one artificial neural network reach across artificial neural networks to send signals to synapses of the other artificial neural network, wherein for each of the segments of another artificial neural network which is to be linked to, there is provided a separate dendrite in an artificial neuron of the artificial neural network with as many synapses as there are artificial neurons in the segment of the other artificial neural network.

11. A computer-implemented method for training and operating an artificial neural network implemented on a computer system that comprises at least one computational unit and at least one memory coupled to the at least one computational unit, the method comprising:

providing the artificial neural network on the computer system, the artificial neural network comprising a plurality of artificial neurons arranged in a plurality of successive segments, the artificial neurons of one segment being connected to artificial neurons of a succeeding segment via dendrites and synapses, each synapse of the artificial neural network having an associated weight factor of a plurality of weight factors stored in the at least one memory, determining, by the artificial neural network, at least one result value from at least one input value applied as input by progressive computation of output values of the artificial neurons through the successive segments, defining at least one subset of synapse of the artificial neural network, the synapses belonging to the at least one subset being entangled synapses, and the synapses of the artificial neural network not belonging to any of the at least one subset being unentangled synapses, updating, by the at least one computational unit, the weight factors of the synapses of the artificial neural network in accordance with a stochastic update rule, the stochastic update rule comprising (i) a deterministic drift term that depends on a partial derivative of a quality function L with respect to the weight factor being updated, and (ii) a stochastic diffusion term comprising an increment dBt of a stochastic process Bt, when an input signal is applied to a synapse belonging to the at least one subset, updating, by the at least one computational unit, all weight factors of all synapses of the at least one subset simultaneously during a single computational step, the increments dBt used to update the weight factors being realizations of correlated random components, the correlated random components being correlated according to a pre-defined correlation structure that is independent of the at least one input value applied as input to the artificial neural network, and when an input signal is applied to an unentangled synapse, updating, by the at least one computational unit, the weight factor of the unentangled synapse individually, the increment dBt used to update the weight factor being a realization of an uncorrelated random component, the uncorrelated random component being uncorrelated with the random components used to update the weight factor of any other synapse of the artificial neural network.

12. The method of claim 11, wherein for each artificial neuron of the at least artificial neural network an output value is determined on basis of input signals applied to synapses of the artificial neuron by means of the weight factors which are assigned to the synapses, an integration function of the artificial neuron and an activation function of the artificial neuron, which output value forms an input signal for at least one synapse of a different artificial neuron of the artificial neural network or forms a component of the result value to be outputted by the artificial neural network, wherein the at least one result value is computed by the artificial neural network on basis of the at least one input value applied to a defined group of synapses by progressive computation of the output values of the artificial neurons.

13. The method of claim 11, wherein an assignment of the at least one defined subset of synapses is changed at least once between two computational steps.

14. The method of claim 11, wherein all weight factors which were assigned the same random component during a randomized initialization of the artificial neural network are assigned to a joint subset of synapses.

15. The method of claim 11, wherein the updating of the subsets of synapses is done by a plurality of computational units of the computer system concurrently.

16. The method of claim 11, wherein the correlated random components are created out of the uncorrelated random components by using a predetermined operation.

17. The method of claim 16, wherein the predetermined operation comprises computing, for each correlated random component $z^C_k$, a weighted sum $z^C_k = C_{k1} \cdot z_1 + C_{k2} \cdot z_2 + \ldots + C_{kN} \cdot z_N$ of uncorrelated random components $z_1, \ldots, z_N$ with coefficients $C_{k1}, \ldots, C_{kN}$ forming the k-th row of a correlation matrix C of the pre-defined correlation structure.

18. The method of claim 11, wherein the correlated random components are created out of the uncorrelated random components by creating weighted sums of the uncorrelated random components.

19. A non-transitory computer-readable storage medium storing instructions which, when executed by at least one computational unit of a computer system. cause the computer system to carry out the method according to claim 11.

* * * * *